Figure 2:
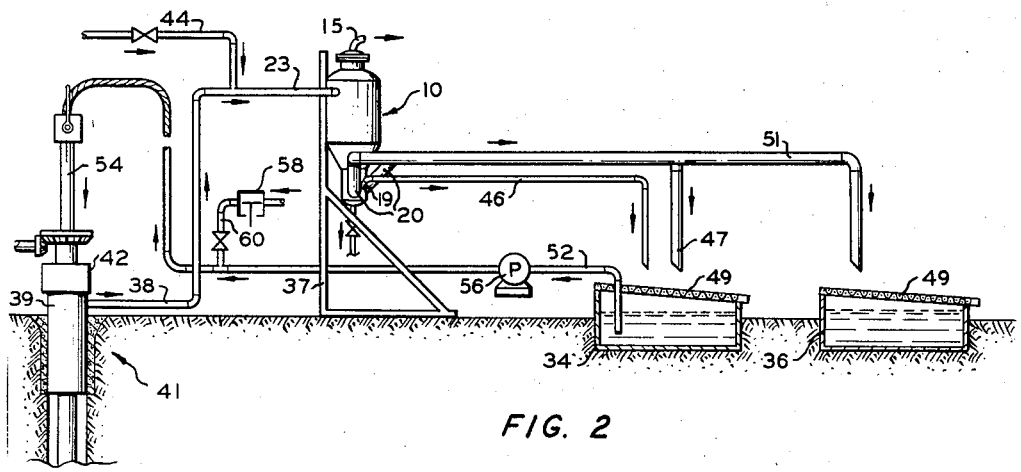

Sept. 16, 1958  G. S. BOUDREAUX ET AL  2,852,091
SEPARATING MEANS FOR AERATED MUD DRILLING
Filed April 3, 1957  2 Sheets-Sheet 1

INVENTORS
G. S. BOUDREAUX
R. S. HOCH
BY Hudson & Young
ATTORNEYS

INVENTORS
G.S. BOUDREAUX
R.S. HOCH

United States Patent Office

2,852,091
Patented Sept. 16, 1958

2,852,091

SEPARATING MEANS FOR AERATED MUD DRILLING

George S. Boudreaux and Robert S. Hoch, Houston, Tex., assignors to Phillips Petroleum Company, a corporation of Delaware Application April 3, 1957, Serial No. 650,435

9 Claims. (Cl. 183—2.5)

This invention relates to means for separating gases from liquids and solids in drilling fluids containing the same.

When using aerated mud as the circulating fluid in rotary drilling, it is necessary to supply means at the surface of the ground to separate the gas and liquid phases of the returning mud stream. It is desirable to provide separating means which are operable throughout the complete range from 0 to 100 percent air. It is also desirable to maintain the solids suspended in the liquid stream until it reaches the mud tanks, thereby eliminating an accumulation of solids in the separating means.

Accordingly, it is an object of the invention to provide improved means for aerated mud drilling. Another object is to provide means for separating gases from liquids and solids in drilling mud passing from circulating means in a well to mud storage. Another object is to provide a mud-gas separator and an arrangement of delivery and intake lines which are effective over a range of concentration of gas in a drilling mud from 0 to 100 percent. It is also an object of the invention to provide a mud-gas separator system which prevents settling and accumulation of cuttings in the separating system and assures delivery thereof to the mud tanks. Other objects of the invention will become apparent from a consideration of the accompanying disclosure.

The separation system of the invention comprises an upright cylindrical separator having means for maintaining downward spiral flow of gases, liquids, and solids, means in the separator for maintaining a vortex with release of gas from the cone of the vortex, and an arrangement of a small diameter and a large diameter discharge conduit from a lower section of the separator with a larger liquid head on the small diameter conduit than on the large diameter conduit so that flow thru the small conduit is preferential and the velocity of flow therethru is sufficient to prevent settling of solids therein. The line from the small diameter discharge conduit to the mud pit does not reach an elevation at any point therein as high as the highest elevation of the line from the large diameter discharge conduit to the mud pit and sufficient head is provided on both discharge conduits and their discharge lines, by positioning them below the level of the inlet to the separator, so as to assure adequate flow rates thru the lines particularly the small diameter discharge conduit and its discharge line to prevent settling of solids therein.

Figure 1:
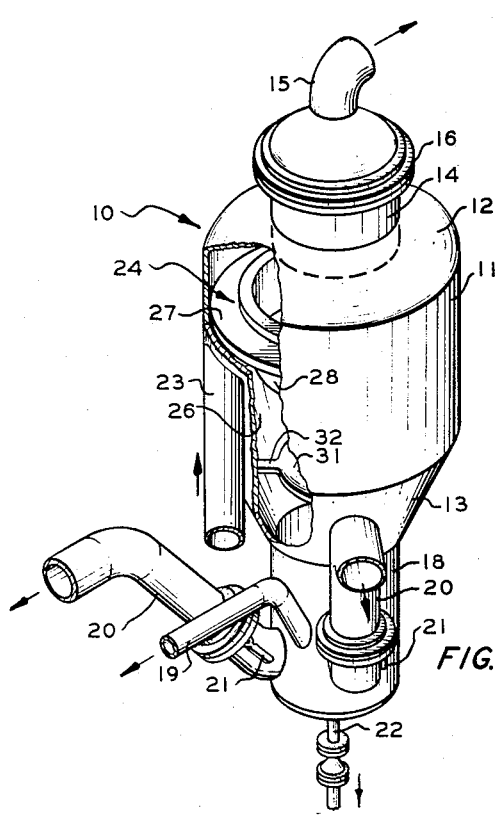
Figure 3:
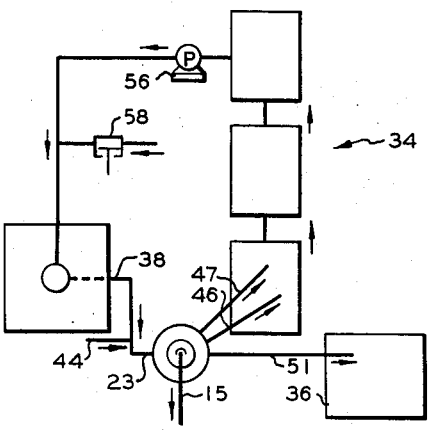
Figure 4:
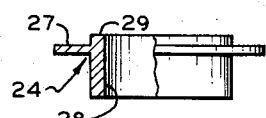

For a more complete understanding of the invention, reference is made to the schematic drawing of which Figure 1 is a pictorial view partially in section of a separator and discharge conduits illustrating a preferred embodiment of the invention; Figure 2 is an elevation of an arrangement of the separator of the invention in combination with a well and mud circulation system; Figure 3 is a plan view of a mud circulation system in combination with a well; Figure 4 is a vertical section thru the vortex finder of Figure 1; and Figure 5 is an elevation of a specific embodiment of the separator of the invention.

Figure 5:
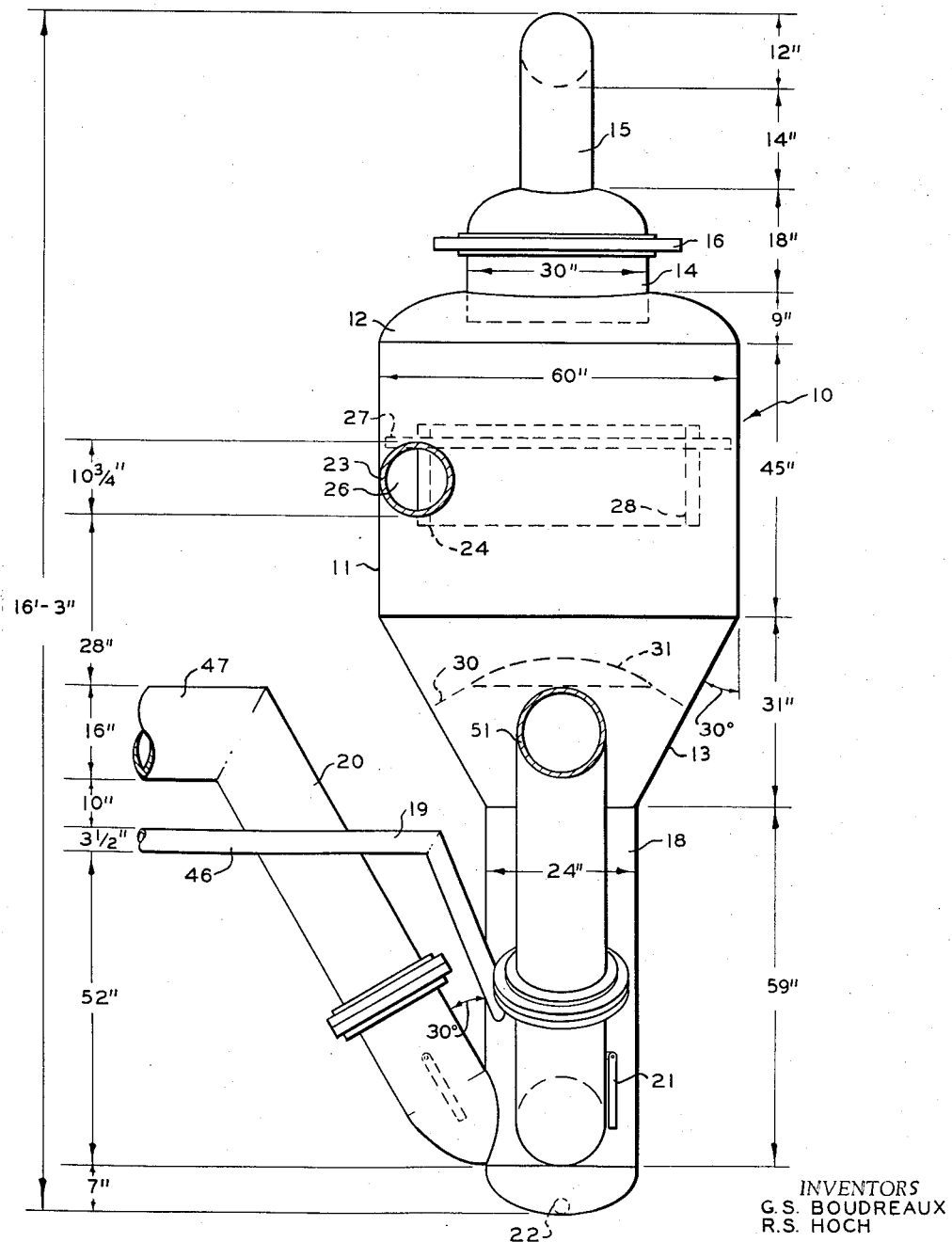

Referring to Figures 1 and 5, a separator 10 comprises a body portion including a cylindrical center section 11, a crowned head 12, and a frusto-conical lower transition section 13. Section 13 and head 12 are welded to section 11. An axial outlet 14 in head 12 converges to a vent pipe 15 which is attached to head 12 in any suitable manner, such as by flanged extension 16. The discharge end of section 13 connects with an outlet member 18 to which it is welded. A relatively small diameter discharge conduit 19 and a pair of relatively large diameter discharge conduits 20 extend upwardly from outlet member 18 with which they are sealed as by welding. Flapper or butterfly valves or other suitable flow control valves 21 are positioned in conduits 20. A drain line 22 leads from the bottom of outlet member 18.

An inlet conduit 23 connects tangentially with shell 11 within which is disposed a vortex finder 24 constructed so as to provide an annular space 26 into which inlet conduit 23 leads. Vortex finder 24 is constructed of a flat ring section 27 and a depending ring section 28 at the inner edge thereof so as to provide a generally inverted L configuration as shown in Figure 4. Ring 27 forms a seal with shell 11 so as to prevent upward flow of liquid from annulus 26. The inner depending ring 28 may comprise a section 29 extending above the level of ring 27 as shown, or it may extend only to the level of the upper surface of ring 27. The inner wall of ring 28 defines an axial passageway for gas which escapes from the separator during operation thereof.

A vortex breaker 31 in the form of a crowned transverse baffle is positioned axially within the separator 10, preferably in section 13, to which it is attached by means of support connectors 32 spaced around the periphery of the baffle at selected intervals.

In Figure 2, separator 10 is disposed at a suitable level above mud tank 34 and reserve tank 36 in which position it is held by a support 37. Inlet 23 is connected with mud return line 38 which connects with casing 39 of well 41 below rotary seal 42. A water line 44, connected with a suitable supply not shown, connects with line 38 or conduit 23 for injecting water into the system as hereinafter explained. Vent line 15 extends to a safe distance from the system for discharge of gas therefrom. Small diameter discharge conduit 19 connects with discharge lines 46 which leads to mud pit 34 and discharge line 47 connects with one of the discharge conduits 20 and discharges liquid mud to shale shaker 49 of mud tank 34. Another discharge line 51 connects with the other discharge conduit 20 and delivers mud to reserve tank 36. A mud injection line 52 leads from mud pit 34 to kelly 54 and has positioned therein a mud pump 56 for circulating mud thru the well annulus and drill string or tubing back to the mud return line which feeds the separator. A compressor 58 is connected by line 60 with mud injection line 52 intermediate mud pump 56 and kelly 54.

Figure 3 shows a plan view of an arrangement similar to that of Figure 2 and is self-explanatory. In this arrangement three mud tanks or pits 34 are connected in series so as to provide adequate settling of cuttings and heavy solids from the drilling fluid before mud is recirculated from the last tank of the series. Discharge line 46 and discharge line 47 deliver drilling fluid to the upstream tank in the series and the other discharge conduit 51 delivers drilling fluid to reserve mud tank 36. It is essential that small diameter discharge conduit 19 and its discharge line 46 have a maximum elevation well below inlet conduit 23 and vortex finder 24 in order to provide adequate liquid head between line 46 and conduit 23 and also to permit the locating of discharge line 47 at a higher elevation than line 46 in order to provide preferential flow thru line 46 and still provide an adequate liquid head between line 47 and conduit 23. Generally, the upper-most elevation of conduit 19 and line 46 is below vortex breaker 31 and there should be a substantial head or pressure differential between lines 46 and 47. By construction in the manner described with discharge conduit 19 and its discharge line 46 of substantially smaller diameter than discharge conduits 20 and their discharge lines 47 and 51, together with the different liquid heads on these lines due to their different elevations below inlet conduit 23, preferential flow is effected thru conduit 19 and the velocity of flow therein is high and of such magnitude as to prevent settling of cuttings and other heavy material in the drilling liquid until the liquid stream reaches the mud pit. As designed and constructed the apparatus of the invention forces substantially all of the cuttings thru conduit 19. The liquid head or pressure differential between conduit 23 and the discharge conduits 19 and 20 should be within a range which maintains a liquid vortex in separator 10 between vortex finder 24 and vortex breaker 31.

Figure 5 shows a specific embodiment of the invention which has been successfully utilized in aerated drilling mud operation with aqueous weighted drilling mud containing air over a wide range of concentrations from substantially zero to substantially 100%. Preferably the height of the pipe connected with outlet 19 is approximately 5 ft. above the bottom of the separator, thus providing a 5 ft. liquid seal to prevent the escape of air and gas through the mud lines. The vent lines are sized to handle the maximum amount of air or gas expected, without exerting a back pressure as much as 5 ft. of water.

In operations utilizing the separating system of the invention aqueous drilling mud is pumped from tank or pit 34 thru line 52 into kelly 54 leading into the drill string of well 41 and return mud passes thru line 38 to inlet conduit 23 of separator 10. Air is introduced to line 52 by means of compressor 58 thru line 60 to provide a desired concentration of air in the drilling fluid. Return mud entering separator 10 via conduit 23 passes into annulus 26 under vortex finder 24 and the tangential introduction of the drilling fluid, together with flange or downwardly depending ring 28, forces the drilling fluid spirally downward forming a vortex within the separator permitting escape or release of air or other gas, such as natural gas introduced to the mud in the well. The escaping gas because of its low density passes upwardly thru the separator and is vented thru line 15. The liquid phase or portion of the mud carrying cuttings passes downwardly into outlet member 18 and thence into discharge conduit 19 because of the greater head on this discharge conduit.

Under normal flow conditions all of the liquid phase of the drilling fluid passes thru discharge conduit 19 and line 46 to the mud pit. When a water pocket is encountered in the well during drilling, flow thru the return mud system is greatly increased and this increased flow is accommodated by either one of discharge conduits 20. In instances where the increased volume of mud or drilling fluid can be passed to mud pit 34 without undue contamination thereof, such as by excessive water, the flow is directed to discharge line 47 but where excessive water or other undesirable fluid is introduced to the drilling fluid, the flow is directed by control of valves 21 thru the other discharge conduit 20 leading to discharge line 51 which delivers the drilling fluid to the reserve mud pit and avoids contamination of the drilling fluid in mud pit 34. During unloading of liquid mud from the well, flow thru discharge conduit 20 as well as conduit 19 is also necessary in order to accommodate the volume of mud flowing thru the return line.

When operating the drilling process with high air concentration or without any liquid present in the drilling fluid, it is highly advantageous to introduce water into return mud line 38 via line 44 so that the water entrains the solid particles or cuttings in the air suspension from the well and carries them to the bottom of separator 10 for discharge to the mud tanks while venting the air thru line 15.

In the preceding discussion, it is to be understood that the term drilling mud is used in its broad connotation to include aerated and non-aerated drilling fluids ranging in composition from 0 to 100 percent air. In most rotary drilling operations weighted aqueous mud is utilized and when aerated mud is used at various times during the drilling, air is injected into the aqueous mud, or the aqueous mud is entirely replaced with air under special conditions.

Certain modifications of the invention will become apparent to those skilled in the art and the illustrative details disclosed are not to be construed as imposing unnecessary limitations on the invention.

We claim:

1. A centrifugal separator for separating particulate solids from fluids comprising a generally cylindrical upright shell having a frusto-conical lower section converging into a cylindrical outlet member and a top closure member opening at its axis into an outlet for gas; a vortex finder within an intermediate section of said shell forming an upright annulus therewith, open on the lower side and closed on the upper side, and providing an axial passageway for fluid; a vortex breaker positioned axially within said shell below said vortex finder; an inlet conduit thru said shell tangential thereto and leading into said annulus; and separate conduit means of different cross section for withdrawing separate streams of different cross section from said outlet member.

2. The separator of claim 1 wherein said separate conduit means comprise a first conduit of smaller cross section extending to a level above its juncture with said outlet member sufficient to maintain a liquid lever in said shell but below the level of vortex breaker; and at least one second conduit of larger cross section extending to a level above said first conduit but below said vortex finder.

3. The separator of claim 2 including flow control means in said at least one second conduit.

4. Apparatus comprising in combination the separator of claim 1; a well having drilling fluid circulation conduits including a return drilling fluid line connected with the inlet conduit of said separator; a reservoir for drilling liquid connected with the drilling fluid inlet of said well; a first conduit leading from the smaller conduit means connected with said outlet member to said reservoir the highest elevation in said first conduit being above the juncture of said smaller conduit with said member but below the level of said vortex breaker; a second conduit leading from the larger of said conduit means to said reservoir, the highest elevation therein being above the highest elevation in said first conduit but below the level of said vortex finder; and a gas disposal conduit from said outlet for gas.

5. The apparatus of claim 4 including a water injection line connected with said return drilling fluid line.

6. The apparatus of claim 4 including a second larger conduit means connected with said member; a third conduit leading from said second larger conduit means to a reserve reservoir, the highest elevation of said third conduit being that of said second conduit; and flow control means in each said second and third conduits.

7. A centrifugal separator for separating particulate solids from fluids comprising a generally cylindrical upright shell having a frusto-conical lower section converging into a cylindrical outlet member and a top closure member opening at its axis into an outlet for gas; a ring-type baffle within an intermediate section of said shell comprising an upright ring section depending from the inner edge of a flat ring section contiguous with said shell, said baffle forming an annulus between said shell and said upright ring section closed at its upper end and open at its bottom end; a tangential inlet in said shell to said annulus for injection of fluid containing solids in suspension; a relatively small diameter discharge conduit leading upwardly from said outlet member; and a relatively large diameter discharge conduit leading upwardly from said outlet member.

8. The separator of claim 7 wherein said large discharge conduit extends to a level intermediate said outlet member and the cylindrical portion of said shell, and said small diameter discharge conduit extends to a lower level; and including a vortex breaker comprising an upwardly convex baffle transversely and axially positioned within said frusto-conical section forming an annulus with same for passage of fluids and solids.

9. The separator of claim 8 including a second large diameter discharge conduit extending from said outlet member to about the same level as first said large diameter conduit, said first conduit leading to a mud pit and said second conduit leading to a reserve mud pit.

References Cited in the file of this patent

UNITED STATES PATENTS

| | | |
|---|---|---|
| 2,181,456 | Johansson | Nov. 28, 1939 |
| 2,378,632 | Hooker et al. | June 19, 1945 |

FOREIGN PATENTS

| | | |
|---|---|---|
| 522,765 | Belgium | Sept. 30, 1953 |